UNITED STATES PATENT OFFICE.

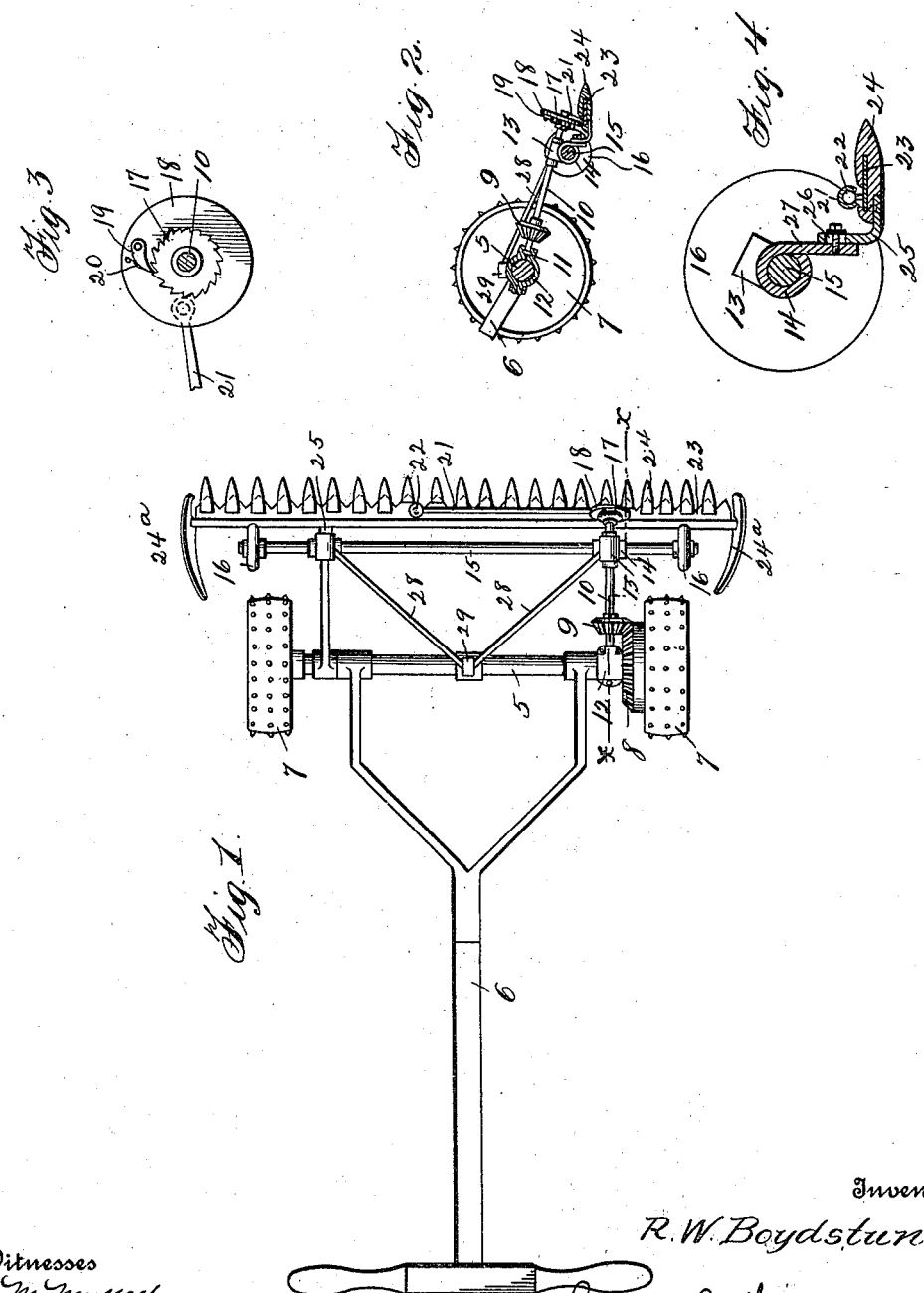
R. W. BOYDSTUN.
LAWN MOWER.
APPLICATION FILED NOV. 6, 1913.
1,093,168. Patented Apr. 14, 1914.

ROBERT W. BOYDSTUN, OF NATCHITOCHES, LOUISIANA.

LAWN-MOWER.

1,093,168.  Specification of Letters Patent.  Patented Apr. 14, 1914.

Application filed November 6, 1913.  Serial No. 799,556.

*To all whom it may concern:*

Be it known that I, ROBERT W. BOYDSTUN, a citizen of the United States, residing at Natchitoches, in the parish of Natchitoches and State of Louisiana, have invented certain new and useful Improvements in Lawn-Mowers, of which the following is a specification.

This invention relates to lawn mowers and has for its object, the provision of a lawn mower adapted to make a wide cut and to cut closely up into corners and around the edges of walks, hedges, fences and the like.

Further objects and advantages of the invention will be set forth in the detailed description which now follows.

In the accompanying drawing, Figure 1 is a plan view of a lawn mower constructed in accordance with the invention, Fig. 2 is a sectional view therethrough upon line X—X of Fig. 1, Fig. 3 is a detail view of a ratchet and disk hereinafter described, and Fig. 4 is a sectional detail view of the connection for supporting the cutter bar from a floating shaft hereinafter described.

Like numerals designate corresponding parts in all of the figures of the drawing.

In the drawing, the numeral 5 designates a shaft carrying a handle 6 and ground wheels 7, said ground wheels being preferably toothed or otherwise roughened to adapt them to secure a firm grip upon the ground. The wheels 7 are preferably loose on the shaft 5 and the right hand wheel 7 carries a bevel gear wheel 8 which meshes with a pinion 9 that is fast upon a shaft 10. The rear end of this shaft is provided with a head 11 which, while permitting rotation of shaft 10 in a bearing 12, prevents endwise movement of said shaft with relation to said bearing. The forward end of the shaft passes through a bearing extension 13 of a bearing sleeve 14, the latter being mounted upon a floating shaft 15 which carries ground wheels 16. The forward end of shaft 10 carries a ratchet wheel 17 which is fast upon shaft 10. A disk 18 is likewise mounted upon shaft 10 but is loose with relation thereto. A pawl 19 is pivoted to disk 18 and a spring 20 acts to normally hold this pawl into engagement with the teeth of ratchet 17. It will therefore be seen that when the mower is pushed forward, gear wheel 8 will rotate to the right in Fig. 1 and impart rotation to shaft 10. At this time, the pawl and ratchet connection between ratchet wheel 17 and disk 18 will cause rotation to be imparted to said disk 18, but when the mower is drawn rearwardly and the direction of rotation of shaft 10 is reversed, no movement will be imparted to disk 18.

Pivotally connected to the front face of disk 18 is a connecting rod 21 which has a ball and socket connection at 22 with the cutter blade 23, said cutter blade being slidably mounted in cutter bar 24. The ends of the cutter bar 24 carry shoes 24ª of a well known type which clearly define the swath cut and tend to rake the grass away from the uncut edge. This cutter bar carries brackets 25 which have a bolt and slot connection indicated at 26 with a bracket extension 27 of bearing sleeve 14, by virtue of which construction the height of the cutter bar with relation to the floating shaft 15 may be readily adjusted, for the floating shaft 15 is supported upon the ground wheels 16. Oblique braces 28 extend between the bearing sleeves 14 and the collar 29 on shaft 5.

It is apparent that rotation of disk 18 will, through the connecting rod or pitman 21 and the ball and socket connection 22, impart reciprocation to the cutter blade 23, to thereby move the cutter blade with relation to the cutter bar in the usual and well known manner.

The arrangement herein shown and described provides a structure which renders it possible to cut closely up into corners or along hedges where it is impossible to cut with the ordinary type of lawn mower.

In practice, it is apparent that proper housings and oil cups for lubrication of the various parts may be provided without departure from the invention, these parts being well known mechanical expedients and forming no part of the invention.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

Having described my invention, what I claim is:

1. A lawn mower, comprising a transverse shaft, ground wheels supported thereon, a floating shaft disposed in advance of the first named shaft and in parallelism therewith, ground wheels upon which said floating shaft is mounted, arms extending between said transverse shaft and said floating shaft for connecting said shafts together while permitting said floating shaft to have swinging movement with relation to said transverse shaft, a cutter bar disposed in advance of the floating shaft, an adjustable connection between said floating shaft and said cutter bar, a cutter blade disposed in said cutter bar, and connections between said cutter blade and one of the first named ground wheels.

2. A lawn mower comprising a transverse shaft, ground wheels supported thereon, a floating shaft disposed in advance of the first named shaft, ground wheels upon which said floating shaft is mounted, arms extending between said transverse shaft and said floating shaft for connecting said shafts together while permitting said floating shaft to have swinging movement with relation to said transverse shaft, a cutter bar disposed in advance of the floating shaft, an adjustable connection between said floating shaft and said cutter bar, a cutter blade disposed in said cutter bar, and connections between said cutter blade and one of the first named ground wheels, said connections comprising a rotative disk, a pitman connected to said disk at one end and to said cutter blade at its opposite end, a rotative shaft having a bearing at one end upon said floating shaft, and supported at its opposite end upon said transverse shaft, gearing between said rotative shaft and one of the first named ground wheels, and a pawl and ratchet connection between said disk and said rotative shaft.

3. A lawn mower comprising a transverse shaft, ground wheels upon which said shaft is supported, an operating handle secured to said shaft, a floating shaft in advance of said transverse shaft, ground wheels upon which said floating shaft is supported, a cutter bar disposed in advance of said floating shaft, a cutter blade mounted in said cutter bar, a pitman connected to said cutter blade, a disk to which said pitman is pivotally connected, a rotative shaft, a pawl and ratchet connection between said rotative shaft and said disk, bearings carried by the floating shaft adjacent the opposite ends thereof through one of which said rotative shaft passes, a bearing carried by the transverse shaft in which the rear end of said rotative shaft is journaled, said rotative shaft being provided with an enlarged collar within said last named bearing to prevent endwise movement of said shaft, bevel gearing between one of the first named ground wheels and said rotative shaft, and an arm mounted to swing upon the transverse shaft and engaging the other bearing of the floating shaft, said arm and said rotative shaft complementally forming members which support the floating shaft rigidly in advance of the transverse shaft while permitting floating movement thereof.

4. A lawn mower comprising a transverse shaft, ground wheels upon which said shaft is supported, an operating handle secured to said shaft, a floating shaft in advance of said transverse shaft, ground wheels upon which said floating shaft is supported, a cutter bar disposed in advance of said floating shaft, a cutter blade mounted in said cutter bar, a pitman connected to said cutter blade, a disk to which said pitman is pivotally connected, a rotative shaft, a pawl and ratchet connection between said rotative shaft and said disk, bearings carried by the floating shaft adjacent the opposite ends thereof through one of which said rotative shaft passes, a bearing carried by the transverse shaft in which the rear end of said rotative shaft is journaled, said rotative shaft being provided with an enlarged collar within said last named bearing to prevent endwise movement of said shaft, bevel gearing between one of the first named ground wheels and said rotative shaft, an arm mounted to swing upon the transverse shaft and engaging the other bearing of the floating shaft, said arm and said rotative shaft complementally forming members which support the floating shaft rigidly in advance of the transverse shaft while permitting floating movement thereof, and braces extending between the central portion of the transverse shaft and said bearings of the floating shaft.

In testimony whereof I affix my signature in the presence of two witnesses.

ROBERT W. BOYDSTUN.

Witnesses:
E. B. SUDDATH,
L. W. BARLOW.